(12) United States Patent
Kakutani

(10) Patent No.: US 7,387,355 B2
(45) Date of Patent: Jun. 17, 2008

(54) HIGH-IMAGE-QUALITY HALFTONE PROCESS

(75) Inventor: Toshiaki Kakutani, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 48 days.

(21) Appl. No.: 11/581,811

(22) Filed: Oct. 16, 2006

(65) Prior Publication Data

US 2007/0091134 A1 Apr. 26, 2007

(30) Foreign Application Priority Data

Oct. 20, 2005 (JP) .............................. 2005-305738

(51) Int. Cl.
*B41J 2/205* (2006.01)
(52) U.S. Cl. ............................ 347/15; 347/41; 358/1.9
(58) Field of Classification Search .................. 347/15, 347/43, 41; 358/1.2, 1.9, 3.23
See application file for complete search history.

(56) References Cited

U.S. PATENT DOCUMENTS

| | | | | |
|---|---|---|---|---|
| 6,084,604 A * | 7/2000 | Moriyama et al. | ............ | 347/15 |
| 6,203,133 B1 * | 3/2001 | Tanaka et al. | ................ | 347/15 |
| 6,315,391 B1 * | 11/2001 | Kanematsu | .................. | 347/43 |

FOREIGN PATENT DOCUMENTS

| JP | 07-081190 | 3/1995 |
|---|---|---|
| JP | 07-177351 | 7/1995 |
| JP | 10-329381 | 12/1998 |

OTHER PUBLICATIONS

Abstract of Japanese Patent Publication No. 07-081190, Pub. Date: Mar. 28, 1995, Patent Abstracts of Japan.
Abstract of Japanese Patent Publication No. 07-177351, Pub. Date: Jul. 14, 1995, Patent Abstracts of Japan.
Abstract of Japanese Patent Publication No. 10-329381, Pub. Date: Dec. 15, 1998, Patent Abstracts of Japan.

* cited by examiner

*Primary Examiner*—Lamson Nguyen
(74) *Attorney, Agent, or Firm*—Martine Penilla & Gencarella, LLP

(57) ABSTRACT

This invention provides a printing method of printing on a printing medium. The method includes: a dot data generating step of performing a halftone process on image data representing a input tone value of each of pixels constituting an original image, for generating dot data representing a status of dot formation on each of print pixels of a print image to be formed on the print medium; and a print image generating step of forming a dot on each of the print pixels for generating the print image according to the dot data. The halftone process is configured to give specified characteristics to all of dot patterns formed on printing pixels belonging to each of a plurality of basic pixel groups constituting the print image. The print image is formed by mutually combining dots formed on print pixels belonging to each of a plurality of pixel groups for which a physical difference is assumed with dot formation using the print image generating step, in a common print area. The plurality of pixel groups consists of a pixel group that is a combination of a plurality of specific basic pixel groups among the plurality of basic pixel groups, and a pixel group other than the specific basic pixel groups among the plurality of basic pixel groups.

8 Claims, 16 Drawing Sheets

Fig.5

|  | ROW 1 | ROW 2 | ROW 3 | ROW 4 | ROW 5 | ROW 6 | ROW 7 | ROW 8 |
|---|---|---|---|---|---|---|---|---|
| COLUMN 1 | 0 | 1 | 0 | 1 | 0 | 1 | 0 | 1 |
| COLUMN 2 | 2 | 3 | 2 | 3 | 2 | 3 | 2 | 3 |
| COLUMN 3 | 0 | 1 | 0 | 1 | 0 | 1 | 0 | 1 |
| COLUMN 4 | 2 | 3 | 2 | 3 | 2 | 3 | 2 | 3 |
| COLUMN 5 | 0 | 1 | 0 | 1 | 0 | 1 | 0 | 1 |
| COLUMN 6 | 2 | 3 | 2 | 3 | 2 | 3 | 2 | 3 |
| COLUMN 7 | 0 | 1 | 0 | 1 | 0 | 1 | 0 | 1 |
| COLUMN 8 | 2 | 3 | 2 | 3 | 2 | 3 | 2 | 3 |

|  | ROW 1 | ROW 2 | ROW 3 | ROW 4 | ROW 5 | ROW 6 | ROW 7 | ROW 8 |
|---|---|---|---|---|---|---|---|---|
| COLUMN 1 |  |  |  |  | ● |  |  |  |
| COLUMN 2 |  | ● |  |  |  |  |  |  |
| COLUMN 3 |  |  |  |  |  | ● |  |  |
| COLUMN 4 | ● |  |  |  |  |  |  |  |
| COLUMN 5 |  |  | ● |  |  |  |  |  |
| COLUMN 6 |  |  |  |  |  |  |  | ● |
| COLUMN 7 |  |  |  | ● |  |  |  |  |
| COLUMN 8 |  |  |  |  |  |  | ● |  |

Fig.9

|  | ROW 1 | ROW 2 | ROW 3 | ROW 4 | ROW 5 | ROW 6 | ROW 7 | ROW 8 |
|---|---|---|---|---|---|---|---|---|
| COLUMN 1 | 0 | 0 | 0 | 0 | 1 | 0 | 0 | 0 |
| COLUMN 2 | 0 | 1 | 0 | 0 | 0 | 0 | 0 | 0 |
| COLUMN 3 | 0 | 0 | 0 | 0 | 0 | 1 | 0 | 0 |
| COLUMN 4 | 1 | 0 | 0 | 0 | 0 | 0 | 0 | 0 |
| COLUMN 5 | 0 | 0 | 1 | 0 | 0 | 0 | 0 | 0 |
| COLUMN 6 | 0 | 0 | 0 | 0 | 0 | 0 | 0 | 1 |
| COLUMN 7 | 0 | 0 | 0 | 1 | 0 | 0 | 0 | 0 |
| COLUMN 8 | 0 | 0 | 0 | 0 | 0 | 0 | 1 | 0 |

Fig.10

|  | ROW 1 | ROW 2 | ROW 3 | ROW 4 | ROW 5 |
|---|---|---|---|---|---|
| COLUMN 1 | 0 | 1 | 2 | 1 | 0 |
| COLUMN 2 | 1 | 3 | 4 | 3 | 1 |
| COLUMN 3 | 2 | 4 | 5 | 4 | 2 |
| COLUMN 4 | 1 | 3 | 4 | 3 | 1 |
| COLUMN 5 | 0 | 1 | 2 | 1 | 0 |

Fig.11

|   |   |   |   |   |   |   |   | 1 | 2 | 3 | 4 | 5 | 6 | 7 | 8 |   |   |   |   |
|---|---|---|---|---|---|---|---|---|---|---|---|---|---|---|---|---|---|---|---|
| 0 | 0 | 0 | 0 | 1 | 0 | 0 | 0 | 0 | 0 | 0 | 1 | 0 | 0 | 0 | 0 | 0 | 1 | 0 | 0 |
| 0 | 1 | 0 | 0 | 0 | 0 | 0 | 0 | 1 | 0 | 0 | 0 | 0 | 0 | 0 | 1 | 0 | 0 | 0 | 0 |
| 0 | 0 | 0 | 0 | 0 | 1 | 0 | 0 | 0 | 0 | 0 | 0 | 1 | 0 | 0 | 0 | 0 | 0 | 1 | 0 |
| 1 | 0 | 0 | 0 | 0 | 0 | 0 | 0 | 1 | 0 | 0 | 0 | 0 | 0 | 0 | 1 | 0 | 0 | 0 | 0 |
| 0 | 0 | 1 | 0 | 0 | 0 | 0 | 0 | 0 | 1 | 0 | 0 | 0 | 0 | 0 | 0 | 1 | 0 | 0 | 0 |
| 0 | 0 | 0 | 0 | 0 | 0 | 1 | 0 | 0 | 0 | 0 | 0 | 0 | 1 | 0 | 0 | 0 | 0 | 0 | 1 |
| 0 | 0 | 0 | 1 | 0 | 0 | 0 | 0 | 0 | 0 | 1 | 0 | 0 | 0 | 0 | 0 | 1 | 0 | 0 | 0 |
| 0 | 0 | 0 | 0 | 0 | 1 | 0 | 0 | 0 | 0 | 0 | 0 | 1 | 0 | 0 | 0 | 0 | 0 | 1 | 0 |
| 0 | 0 | 0 | 0 | 1 | 0 | 0 | 0 | 0 | 0 | 0 | 1 | 0 | 0 | 0 | 0 | 0 | 1 | 0 | 0 |
| 0 | 1 | 0 | 0 | 0 | 0 | 0 | 0 | 1 | 0 | 0 | 0 | 0 | 0 | 0 | 1 | 0 | 0 | 0 | 0 |
| 0 | 0 | 0 | 0 | 0 | 1 | 0 | 0 | 0 | 0 | 0 | 0 | 1 | 0 | 0 | 0 | 0 | 0 | 1 | 0 |
| 1 | 0 | 0 | 0 | 0 | 0 | 0 | 0 | 1 | 0 | 0 | 0 | 0 | 0 | 0 | 1 | 0 | 0 | 0 | 0 |
| 0 | 0 | 1 | 0 | 0 | 0 | 0 | 0 | 0 | 1 | 0 | 0 | 0 | 0 | 0 | 0 | 1 | 0 | 0 | 0 |
| 0 | 0 | 0 | 0 | 0 | 0 | 1 | 0 | 0 | 0 | 0 | 0 | 0 | 1 | 0 | 0 | 0 | 0 | 0 | 1 |
| 0 | 0 | 0 | 1 | 0 | 0 | 0 | 0 | 0 | 0 | 1 | 0 | 0 | 0 | 0 | 0 | 1 | 0 | 0 | 0 |
| 0 | 0 | 0 | 0 | 0 | 1 | 0 | 0 | 0 | 0 | 0 | 0 | 1 | 0 | 0 | 0 | 0 | 0 | 1 | 0 |
| 0 | 0 | 0 | 0 | 1 | 0 | 0 | 0 | 0 | 0 | 0 | 1 | 0 | 0 | 0 | 0 | 0 | 1 | 0 | 0 |
| 0 | 1 | 0 | 0 | 0 | 0 | 0 | 0 | 1 | 0 | 0 | 0 | 0 | 0 | 0 | 1 | 0 | 0 | 0 | 0 |
| 0 | 0 | 0 | 0 | 0 | 1 | 0 | 0 | 0 | 0 | 0 | 0 | 1 | 0 | 0 | 0 | 0 | 0 | 1 | 0 |
| 1 | 0 | 0 | 0 | 0 | 0 | 0 | 0 | 1 | 0 | 0 | 0 | 0 | 0 | 0 | 1 | 0 | 0 | 0 | 0 |
| 0 | 0 | 1 | 0 | 0 | 0 | 0 | 0 | 0 | 1 | 0 | 0 | 0 | 0 | 0 | 0 | 1 | 0 | 0 | 0 |
| 0 | 0 | 0 | 0 | 0 | 0 | 1 | 0 | 0 | 0 | 0 | 0 | 0 | 1 | 0 | 0 | 0 | 0 | 0 | 1 |
| 0 | 0 | 0 | 1 | 0 | 0 | 0 | 0 | 0 | 0 | 1 | 0 | 0 | 0 | 0 | 0 | 1 | 0 | 0 | 0 |
| 0 | 0 | 0 | 0 | 0 | 1 | 0 | 0 | 0 | 0 | 0 | 0 | 1 | 0 | 0 | 0 | 0 | 0 | 1 | 0 |

Fig.12

|  | ROW 1 | ROW 2 | ROW 3 | ROW 4 | ROW 5 | ROW 6 | ROW 7 | ROW 8 |
|---|---|---|---|---|---|---|---|---|
| COLUMN 1 | 4 | 4 | 6 | 7 | 8 | 9 | 7 | 4 |
| COLUMN 2 | 6 | 6 | 5 | 6 | 7 | 8 | 6 | 5 |
| COLUMN 3 | 7 | 8 | 6 | 5 | 6 | 6 | 5 | 6 |
| COLUMN 4 | 8 | 9 | 7 | 4 | 4 | 4 | 6 | 7 |
| COLUMN 5 | 9 | 8 | 7 | 6 | 4 | 3 | 5 | 7 |
| COLUMN 6 | 7 | 7 | 7 | 7 | 4 | 4 | 6 | 7 |
| COLUMN 7 | 4 | 4 | 6 | 7 | 7 | 7 | 7 | 7 |
| COLUMN 8 | 4 | 3 | 5 | 7 | 9 | 8 | 7 | 6 |

Fig.13

|  | ROW 1 | ROW 2 | ROW 3 | ROW 4 | ROW 5 | ROW 6 | ROW 7 | ROW 8 |
|---|---|---|---|---|---|---|---|---|
| COLUMN 1 |  |  |  |  | ● |  |  |  |
| COLUMN 2 |  |  |  |  |  |  |  |  |
| COLUMN 3 |  |  |  |  |  |  |  |  |
| COLUMN 4 |  |  |  |  |  |  |  |  |
| COLUMN 5 |  |  | ● |  |  |  |  |  |
| COLUMN 6 |  |  |  |  |  |  |  |  |
| COLUMN 7 |  |  |  |  |  |  |  |  |
| COLUMN 8 |  |  |  |  |  |  |  |  |

Fig.14

|  | ROW 1 | ROW 2 | ROW 3 | ROW 4 | ROW 5 | ROW 6 | ROW 7 | ROW 8 |
|---|---|---|---|---|---|---|---|---|
| COLUMN 1 | 0 | 0 | 0 | 0 | 1 | 0 | 0 | 0 |
| COLUMN 2 | 0 | 0 | 0 | 0 | 0 | 0 | 0 | 0 |
| COLUMN 3 | 0 | 0 | 0 | 0 | 0 | 0 | 0 | 0 |
| COLUMN 4 | 0 | 0 | 0 | 0 | 0 | 0 | 0 | 0 |
| COLUMN 5 | 0 | 0 | 1 | 0 | 0 | 0 | 0 | 0 |
| COLUMN 6 | 0 | 0 | 0 | 0 | 0 | 0 | 0 | 0 |
| COLUMN 7 | 0 | 0 | 0 | 0 | 0 | 0 | 0 | 0 |
| COLUMN 8 | 0 | 0 | 0 | 0 | 0 | 0 | 0 | 0 |

Fig.15

|  | 1 | 2 | 3 | 4 | 5 | 6 | 7 | 8 |
|---|---|---|---|---|---|---|---|---|
| 1 | 0 | 0 | 2 | 4 | 5 | 4 | 2 | 0 |
| 2 | 0 | 0 | 1 | 3 | 4 | 3 | 1 | 0 |
| 3 | 0 | 1 | 2 | 2 | 2 | 1 | 0 | 0 |
| 4 | 1 | 3 | 4 | 3 | 1 | 0 | 0 | 0 |
| 5 | 2 | 4 | 5 | 4 | 2 | 0 | 0 | 0 |
| 6 | 1 | 3 | 4 | 3 | 1 | 0 | 0 | 0 |
| 7 | 0 | 1 | 2 | 2 | 2 | 1 | 0 | 0 |
| 8 | 0 | 0 | 1 | 3 | 4 | 3 | 1 | 0 |

Fig.16

|  | ROW 1 | ROW 2 | ROW 3 | ROW 4 | ROW 5 | ROW 6 | ROW 7 | ROW 8 |
|---|---|---|---|---|---|---|---|---|
| COLUMN 1 | 16 | 16 | 26 | 32 | 37 | 40 | 30 | 16 |
| COLUMN 2 | 24 | 24 | 21 | 27 | 32 | 35 | 25 | 20 |
| COLUMN 3 | 28 | 33 | 26 | 22 | 26 | 25 | 20 | 24 |
| COLUMN 4 | 33 | 39 | 32 | 19 | 17 | 16 | 24 | 28 |
| COLUMN 5 | 38 | 36 | 33 | 28 | 18 | 12 | 20 | 28 |
| COLUMN 6 | 29 | 31 | 32 | 31 | 17 | 16 | 24 | 28 |
| COLUMN 7 | 16 | 17 | 26 | 30 | 30 | 29 | 28 | 28 |
| COLUMN 8 | 16 | 12 | 21 | 31 | 40 | 35 | 29 | 24 |

Fig.17

|  | ROW 1 | ROW 2 | ROW 3 | ROW 4 | ROW 5 | ROW 6 | ROW 7 | ROW 8 |
|---|---|---|---|---|---|---|---|---|
| COLUMN 1 | 16 |  | 26 |  | ALREADY |  | 30 |  |
| COLUMN 2 |  |  |  |  |  |  |  |  |
| COLUMN 3 | 28 |  | 26 |  | 26 |  | 20 |  |
| COLUMN 4 |  |  |  |  |  |  |  |  |
| COLUMN 5 | 38 |  | ALREADY |  | 18 |  | 20 |  |
| COLUMN 6 |  |  |  |  |  |  |  |  |
| COLUMN 7 | 16 |  | 26 |  | 30 |  | 28 |  |
| COLUMN 8 |  |  |  |  |  |  |  |  |

Fig.19

$$\text{RMS GRANULARITY LEVEL} = \sqrt{\frac{\Sigma(\text{EVALUATION VALUE} - \text{EVALUATION VALUE AVERAGE})^2}{\text{PIXEL COUNT}}}$$

Fig.22

THIRD VARIATION EXAMPLE

|   | 1 | 2 | 3 | 4 | 5 | 6 | 7 | 8 |   |   |   |   |
|---|---|---|---|---|---|---|---|---|---|---|---|---|
|   | 0 |   | 0 |   | 1 |   | 0 |   |   |   |   |   |
| 0 | 0 | 1 | 0 | 0 | 0 | 0 | 0 | 0 | 0 | 1 | 0 |
| 0 | 0 | 0 | 0 | 0 | 1 | 0 | 0 | 0 | 0 | 0 | 0 |
| 0 | 1 | 0 | 0 | 0 | 0 | 0 | 0 | 0 | 1 | 0 | 0 |
| 0 | 0 | 0 | 0 | 0 | 0 | 1 | 0 | 0 | 0 | 0 | 0 |
| 0 | 0 | 1 | 0 | 0 | 0 | 0 | 0 | 0 | 0 | 1 | 0 |
| 0 | 0 | 0 | 0 | 0 | 1 | 0 | 0 | 0 | 0 | 0 | 0 |
| 0 | 1 | 0 | 0 | 0 | 0 | 0 | 0 | 0 | 1 | 0 | 0 |
| 0 | 0 | 0 | 0 | 0 | 0 | 1 | 0 | 0 | 0 | 0 | 0 |
| 0 | 0 | 1 | 0 | 0 | 0 | 0 | 0 | 0 | 0 | 1 | 0 |
| 0 | 0 | 0 | 0 | 0 | 1 | 0 | 0 | 0 | 0 | 0 | 0 |
| 0 | 1 | 0 | 0 | 0 | 0 | 0 | 0 | 0 | 1 | 0 | 0 |
| 0 | 0 | 0 | 0 |   |   |   |   | 0 | 0 | 0 | 0 |

HIGH-IMAGE-QUALITY HALFTONE PROCESS

BACKGROUND OF THE INVENTION

1. Field of the Invention

This invention relates to technology for printing an image by forming dots on a print medium.

2. Description of the Related Art

As output devices for images created using a computer or images shot using a digital camera or the like, printing devices that print images by forming dots on a printing medium are widely used. These printing devices perform gradation expression using a halftone process because there are few dot tone values that can be formed for the input tone values. As one halftone process, an ordered dither method using a dither matrix is widely used. The ordered dither method has a big effect on the image quality according to the dither matrix contents, so for example as disclosed in JP-A-7-177351, JP-A-7-81190, and JP-A-10-329381, an attempt was made to optimize the dither matrix using an analysis method of simulated annealing or genetic algorithm using an evaluation function taking into consideration the human visual sense.

However, with this kind of dither matrix optimization processing, ink dots are formed by doing a plurality of scans of the common area on the printing medium, and there was no consideration of the degradation of image quality due to printing of images by doing this. Meanwhile, for the method of scanning on the printing medium, because there is a wide variety, if each method is simply optimized, there will be a demand to design and implement a huge variety of types of halftone processing methods. Furthermore, this kind of image quality degradation is not limited to halftone processing using the dither matrix, and occurs in general with printing using halftone processing.

SUMMARY OF THE INVENTION

The present invention was created to address the problems of the prior art noted above, and its purpose is to provide a technology for forming ink dots by doing a plurality of scans of a common area on a printing medium, and by doing this, to suppress the degradation of the image quality due to printing of the image.

In order to attain the above and the other objects of the present invention, there is provided a printing method of printing on a printing medium. The method includes: a dot data generating step of performing a halftone process on image data representing a input tone value of each of pixels constituting an original image, for generating dot data representing a status of dot formation on each of print pixels of a print image to be formed on the print medium; and a print image generating step of forming a dot on each of the print pixels for generating the print image according to the dot data. The halftone process is configured to give specified characteristics to all of dot patterns formed on printing pixels belonging to each of a plurality of basic pixel groups constituting the print image. The print image is formed by mutually combining dots formed on print pixels belonging to each of a plurality of pixel groups for which a physical difference is assumed with dot formation using the print image generating step, in a common print area. The plurality of pixel groups consists of a pixel group that is a combination of a plurality of specific basic pixel groups among the plurality of basic pixel groups, and a pixel group other than the specific basic pixel groups among the plurality of basic pixel groups.

With the printing method of the present invention, dots formed on the printing pixels belonging to each of the plurality of pixel groups for which physical differences are assumed with dot formation are formed by mutually combining in a common printing area, and these plurality of pixel groups are constituted from a plurality of basic pixel groups. With this printing method, the halftone process is constituted so that any of the dot patterns formed on the printing pixels belonging to each of the plurality of basic pixel groups has specified characteristics, so each of the plurality of pixel groups constituted from the plurality of basic pixel groups also has the specified characteristics.

In this way, with the present invention, the halftone process is constituted so that there are specified characteristics in each of the plurality of basic pixel groups, so it is possible to improve the image quality by having specified characteristics in the print image even with a wide variety of dot forming methods constituted by combining a plurality of pixel groups constituted by a plurality of basic pixel groups. As a result, it is possible to reduce the types of halftone processing processes for the wide variety of dot forming methods.

Here, "give specified characteristics to all of dot patterns" means that when the specified characteristic is the evaluation criterion of the granularity index, for example, as with the prior art, rather than optimizing so that only the granularity index of the print image dot pattern is low, optimization is done so that the pixel group and the group of pixel groups dot pattern granularity index is low. Specifically, the print image dot pattern granularity index is allowed to be slightly high, and optimization is done so that the pixel group and the group of pixel groups dot pattern granularity index is low. To say this another way, this means that the constitution is such that each of the granularity indexes are mutually close.

Meanwhile, physical difference has a broad meaning including mechanical error of the printing device such as measurement error of the printing head position or measurement error of the sub scan sending volume, or physical factors such as main scan direction error due to uplift of the printing paper or skew or sequence of the ink spray timing (timing error).

The present invention is constituted using three findings newly found by the inventors. The first finding is the finding that the characteristics of the dot patterns of the combined pixel groups are close to the dot patterns of the pixel groups before combining. The second finding is the finding that though there is a difference for each dot formation mode for each of the plurality of pixel groups for which physical differences are assumed with dot formation, there are many cases for which it is possible to constitute by mutually combining between dot formation modes. For example, as described later, there are cases for which by combining two pixel groups of one dot forming mode, it is possible to constitute one pixel group of the other dot forming mode.

Note that the present invention can be realized with various aspects including a printing device, a dither matrix, a dither matrix generating device, a printing device or printing method using a dither matrix, or a printed matter generating method, or can be realized with various aspects such as a computer program for realizing the functions of these methods or devices on a computer, a recording medium on which that computer program is recorded, data signals containing that computer program and embodied within a carrier wave, and the like.

Also, for use of the dither matrix for the printing device, printing method, or printed matter generating method, by comparing the threshold value set in the dither matrix with the image data tone value for each pixel, a decision is made of whether or not dots are formed for each pixel, but, for example, it is also possible to make a decision on whether or not dots are formed by comparing the sum of the threshold value and the tone value with a fixed value. Furthermore, it is also possible to make a decision on whether or not dots are formed according to data generated in advance based on the threshold value and on the tone value without directly using the threshold value. The dither method of the present invention generally is acceptable as long as the judgment of whether or not to form dots is made according to the tone value of each pixel and on the threshold value set in the pixel position corresponding to the dither matrix.

BRIEF DESCRIPTION OF THE DRAWINGS

FIG. 5 is an explanatory drawing showing the dither matrix M for which the grouping process is performed for the first embodiment of the present invention;

FIG. 6 is an explanatory drawing showing the four divided matrixes M0 to M3 for the first embodiment of the present invention;

FIG. 8 is an explanatory drawing showing the state of dots being formed on each of the eight pixels corresponding to the elements in which are stored the threshold value for which dot formation is easy first to eighth for the dither matrix M;

FIG. 9 is an explanatory drawing showing the matrix for which the state of dot formation on each of eight pixels is converted to numbers, specifically, the dot density matrix quantitatively representing the dot density;

FIG. 10 is an explanatory drawing showing the low pass filter for the first embodiment of the present invention;

FIG. 11 is an explanatory drawing showing the state of the same dot density matrixes being placed in the periphery to perform calculation of the peripheral part of the dot density matrix;

FIG. 12 is an explanatory drawing showing the results of doing low pass filter processing of the dot density matrix;

FIG. 13 an explanatory drawing showing the dot pattern for which only dots corresponding to pixels belonging to the divided matrix M0 are extracted;

FIG. 14 is an explanatory drawing showing the dot density matrix relating to the divided matrix M0;

FIG. 15 is an explanatory drawing showing the matrix for storing the group evaluation value;

FIG. 16 is an explanatory drawing showing the matrix for storing the set comprehensive evaluation value;

FIG. 17 is an explanatory drawing showing the matrix for which only the elements belonging to the divided matrix M0 are extracted from the comprehensive evaluation value matrix;

FIG. 19 is an explanatory drawing showing the calculation formula used for the RMS granularity level calculation process;

FIG. 22 is an explanatory drawing showing the state of the same dot density matrix being placed in the periphery to perform calculation of the peripheral part of the dot density matrix for the variation example.

DESCRIPTION OF THE PREFERRED EMBODIMENT

Figure 1:
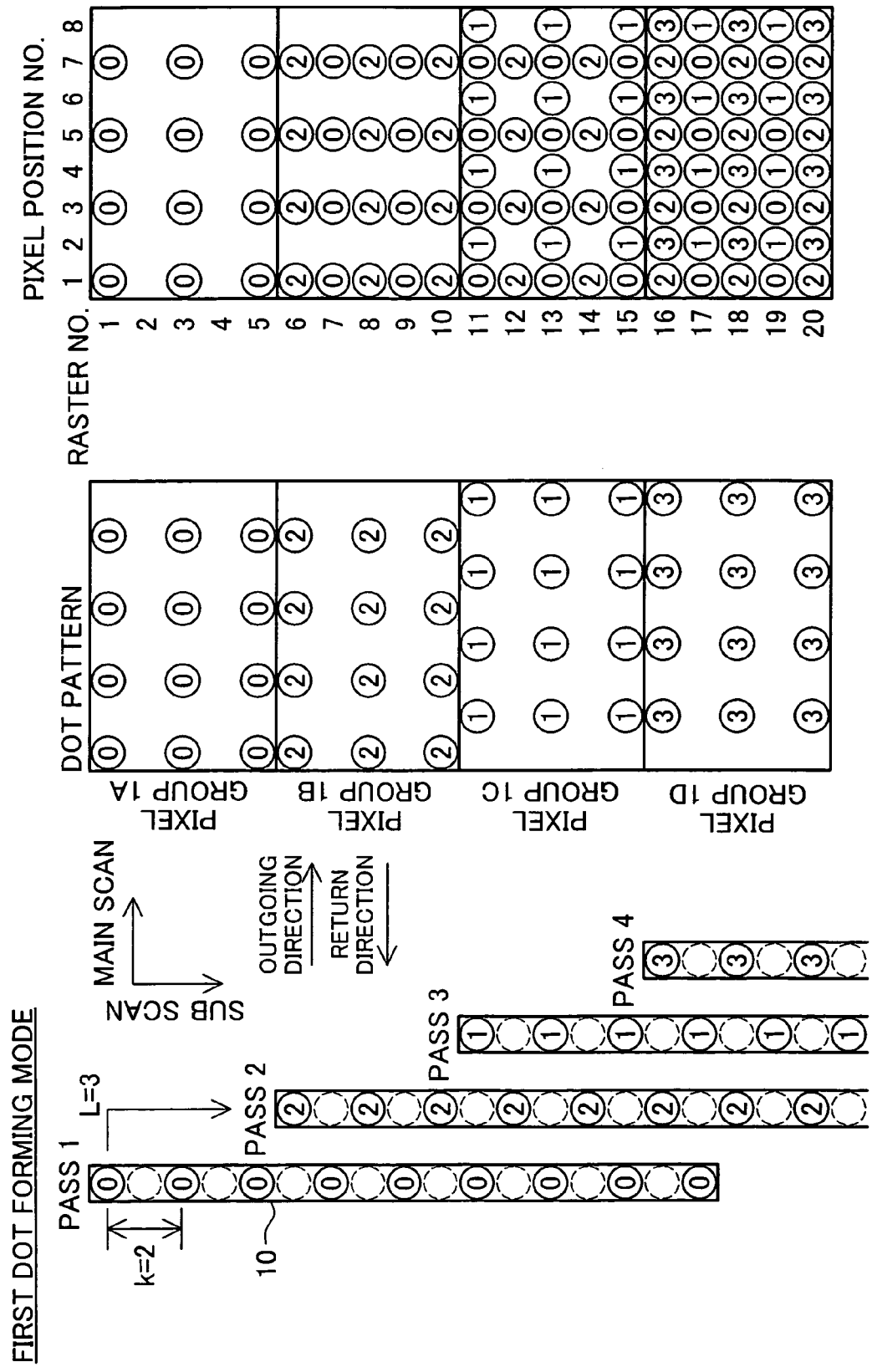
FIG. 1 is an explanatory drawing showing the state of the print image being generated on a printing medium using the first dot forming mode which is one of a plurality of dot forming modes for the first embodiment of the present invention.

The present invention is explained in the following sequence based on embodiments.
A. Generation of Print images Executed While Performing Main Scanning and Sub Scanning:
B. Dither Matrix Generating Method for the First Embodiment:
C. Dither Matrix Generating Method for the Second Embodiment:
D. Variation Example:
A. Generation of Print images Executed While Performing Main Scanning and Sub Scanning:

FIG. 1 is an explanatory drawing showing the state of the print image being generated on a printing medium using the first dot forming mode which is one of a plurality of dot forming modes for the first embodiment of the present invention. In the plurality of dot forming modes, the print image is generated on the printing medium by forming ink dots while performing main scanning and sub scanning of the printing head 10. The main scan means the operation of moving the printing head 10 relatively in the main scan direction in relation to the printing medium. The sub scan means the operation of moving the printing head 10 relatively in the sub scan direction in relation to the printing medium. The printing head 10 is constituted so as to form ink dots by spraying ink drops on the printing medium. The printing head 10 is equipped with ten nozzles that are not illustrated at intervals of 2 times the pixel pitch k.

In the first dot forming mode, generation of the print image is performed as follows while performing main scanning and sub scanning. Among the ten main scan lines of raster numbers 1, 3, 5, 7, 9, 11, 13, 15, 17, and 19, ink dots are formed at the pixels of the pixel position numbers 1, 3, 5, and 7. The main scan line means the line formed by the continuous pixels in the main scan direction. Each circle indicates the dot forming position. The number inside each circle indicates the pixel groups constituted from the plurality of pixels for which ink dots are formed simultaneously. With pass 1, dots are formed on the print pixels belong to the pixel group 1A while a main scan is done in the main direction.

When the pass 1 main scan is completed, the sub scan sending is performed at a movement volume L of 3 times the pixel pitch in the sub scan direction. Typically, the sub scan sending is performed by moving the printing medium, but with this embodiment, the printing head 10 is moved in the sub scan direction to make the description easy to understand. When the sub scan sending is completed, the pass 2 main scan is performed.

With the pass 2 main scan, among the ten main scan lines for which the raster numbers are 6, 8, 10, 12, 14, 16, 18, 20, 22, and 24, ink dots are formed at the pixels for which the pixel position number is 1, 3, 5, and 7. Working in this way, with pass 2, dots are formed on the print pixels belonging to the pixel group 1B while main scanning is performed. Note that the two main scan lines for which the raster numbers are 22 and 24 are omitted in the drawing. When the pass 2 main scan is completed, after the sub scan sending is performed in the same way as described previously, the pass 3 main scan is performed.

With the pass 3 main scan, among the ten main scan lines including the main scan lines for which the raster numbers are 11, 13, 15, 17, and 19, ink dots are formed on the pixels for which the pixel position numbers are 2, 4, 6, and 8. With the pass 4 main scan, among the ten main scan lines including the three main scan lines for which the raster numbers are 16, 18, and 20, ink dots are formed on the pixels for which the pixel position numbers are 2, 4, 6, and 8. Working in this way, we can see that it is possible to form ink dots without gaps in the sub scan position from raster number 15 and thereafter. With pass 3 and pass 4, dots are formed on the print pixels belonging respectively to the pixel groups 1C, 1D.

When monitoring this kind of print image generation focusing on a fixed area, we can see that this is performed as noted below. For example, when the focus area is the area of pixel position numbers 1 to 8 with the raster numbers 15 to 19, we can see that the print image is formed as noted below at the focus area.

With pass 1, at the focus area, we can see that a dot pattern is formed that is the same as the ink dots formed at the pixel positions for which the pixel position numbers are 1 to 8 with the raster numbers 1 to 5. This dot pattern is formed by dots formed at the pixels belonging to the pixel group 1A. Specifically, with pass 1, for the focus area, dots are formed at pixels belonging to the pixel group 1A.

With pass 2, at the focus area, dots are formed at the pixels belonging to the pixel group 1B. With pass 3, at the focus area, dots are formed at the pixels belonging to the pixel group 1C. With pass 4, at the focus area, dots are formed at the pixels belonging to the pixel group 1D.

In this way, with this embodiment, we can see that the dots formed at the print pixels belonging to each of the plurality of first to pixel group 1Ds are formed by mutually combining at the common print area.

Figure 2:
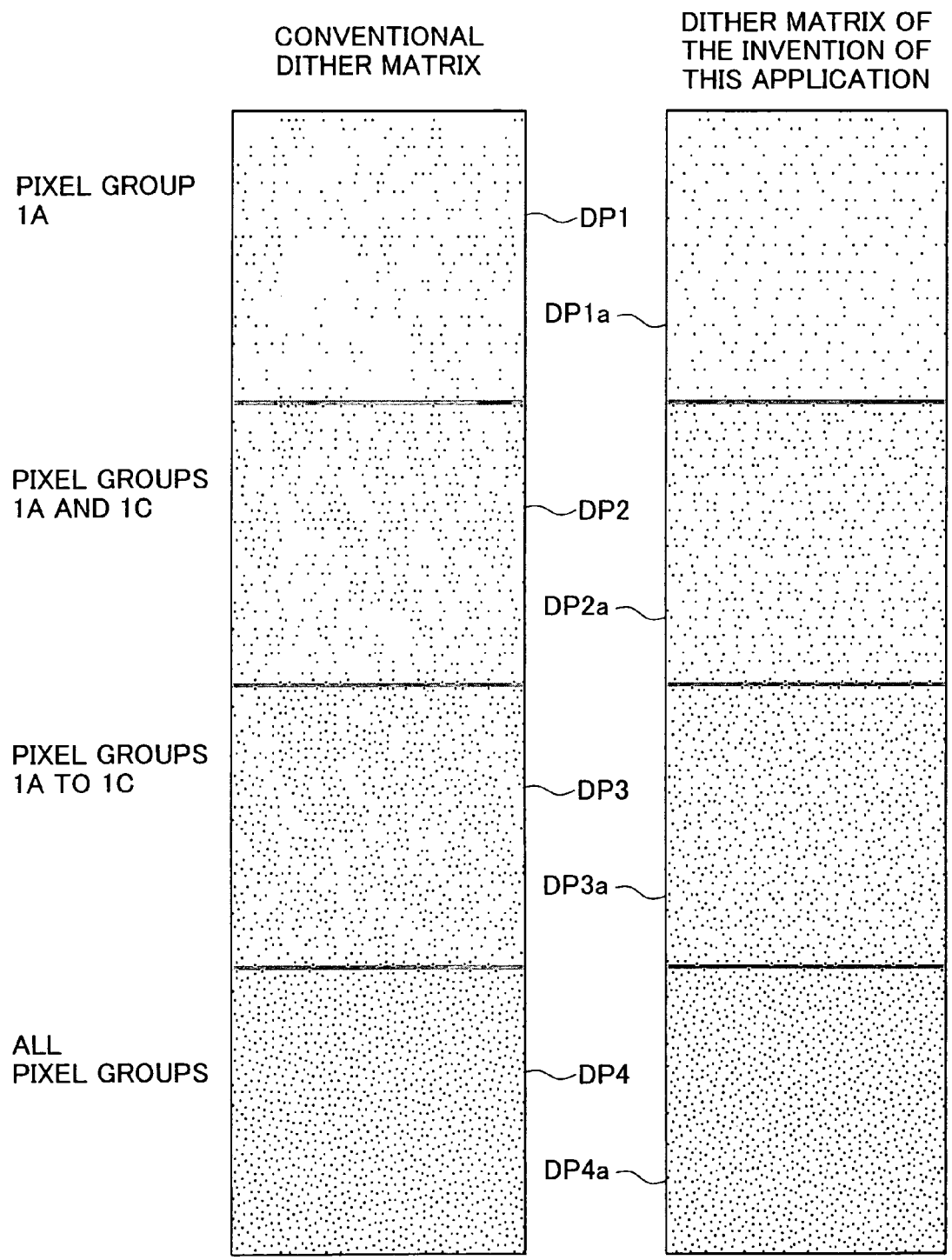
FIG. 2 is an explanatory drawing showing the state of the print image being generated on a printing medium with pixel images belonging to each of a plurality of pixel groups being combined in a common printing area for the first embodiment of the present invention.

FIG. 2 is an explanatory drawing showing the state of generating a print image on a printing medium by mutually combining on a common print area the dots formed on the print pixels belonging to each of the plurality of pixel groups for the first embodiment of the present invention. With the example of FIG. 2, the print image is the print image of a specified medium gradation (single color). The dot patterns DP1 and DP1*a* indicate dot patterns formed at a plurality of pixels belonging to the pixel group 1A. The dot patterns DP2 and DP2*a* indicate dot patterns formed on the plurality of pixels belonging to the pixel groups 1A, 1B. The dot patterns DP3 and DP3*a* indicate dot patterns formed on the plurality of pixels belonging to the pixel groups 1A, 1B, 1C. The dot patterns DP4 and DP4*a* indicate dot patterns formed on the plurality of pixels belonging to all the pixel groups.

The dot patterns DP1, DP2, DP3, and DP4 are dot patterns when using the dither matrix of the prior art. The dot patterns DP1*a*, DP2*a*, DP3*a*, and DP4*a* are dot patterns when using the dither matrix of the invention of this application. As can be understood from FIG. 2, when using the dither matrix of the invention of this application, especially with the dot patterns DP1*a* and DP2*a* for which there is little dot pattern overlap, the dot dispersibility is more uniform than when using the dither matrix of the prior art.

With the dither matrix of the prior art, optimization is performed focusing only on the dot dispersibility for the finally formed print image (with the example in FIG. 2, dot pattern DP4) because there is no concept of a pixel group. To say this another way, because the dispersibility of dots formed on the pixels belonging to each pixel group is not considered, the dispersibility of dots formed on the pixels belonging to each pixel group is poor, and dot density sparseness occurs.

The dither matrix of the invention of this application, in addition to the dispersibility of the dots for the print image, also considers up to the dispersibility of the dots formed on the pixels belonging to each pixel group, so the dispersibility of the dots formed on the pixels belonging to each pixel group and the dispersibility of dots for the print image are both improved.

The dither matrix of the invention of this application attempts to optimize not only the finally formed dot patterns, but also focuses on dot patterns with the dot forming process. This kind of focus point did not exist in the past. This is because in the past, the technical basic assumption was that even if the dot pattern dispersion was poor with the dot forming process, the image quality was good if the dispersibility of the dot patterns formed at the end were good.

However, the inventors of this application went ahead and performed an analysis of the image quality of print images focusing on the dot patterns with the dot forming process. As a result of this analysis, it was found that image unevenness occurs due to dot pattern sparseness with the dot forming process. This image unevenness was ascertained by the inventors of this application to be strongly perceived by the human eye as ink physical phenomena such as ink agglomeration unevenness, glossiness, or the bronzing phenomenon. Note that the bronzing phenomenon is a phenomenon by which the status of the light reflected by the printing paper surface is changed, such as the printing surface exhibiting a color of a bronze color or the like due to ink drop pigment agglomeration or the like.

For example, the ink agglomeration or bronzing phenomenon can occur even in cases when a print image is formed with one pass. However, even when ink agglomeration or the like occurs uniformly on the entire surface of the print image, it is difficult to be seen by the human eye. This is because since it occurs uniformly, ink agglomeration or the like does not occur as non-uniform "unevenness" including low frequency components.

However, when unevenness occurs with low frequency areas which are easily recognized by the human eye with ink agglomeration or the like for dot patterns formed in pixel groups for which ink dots are formed almost simultaneously with the same main scan, this is manifested as a strong image quality degradation. In this way, when forming print images using ink dot formation, it was first found by the inventors that optimization of the dither matrix focusing also on dot patterns formed in pixel groups for which ink dots are formed almost simultaneously is linked to higher image quality.

In addition, with the dither matrix of the prior art, optimization was attempted with the prerequisite that the mutual positional relationship of each pixel group is as presupposed, so optimality is not guaranteed when the mutual positional relationship is skewed, and this was a cause of marked degradation of the image quality. However, with the dither matrix of the present invention, dot dispersibility is ensured even with dot patterns for each pixel group for which mutual positional relationship skew is assumed, so it was first confirmed by experiments of the inventors of the invention of this application that it is possible to also ensure a high robustness level in relation to mutual positional relationship skew.

Furthermore, for the technical concept of the invention of this application, it was also ascertained by the inventors that the importance increases as the printing speed accelerates. This is because acceleration of the printing speed is connected to the formation of dots in the next pixel group during the time that sufficient time has not been taken for ink absorption. The invention of this application is constituted as follows based on these kinds of totally novel findings.

However, optimizing the dither matrix with a focus also on the dot patterns formed on the pixel groups on which ink dots are formed almost simultaneously means that when the pixel groups change according to a change in the dot formation method, typically, the optimality is not guaranteed. On the other hand, with printing that is performed while performing main scans and sub scans, typically, there is a tradeoff between speed and image quality, or a plurality of printing modes are implemented according to the type of image subject to printing such as text or natural images, and the dot forming method generally changes.

Figure 3:
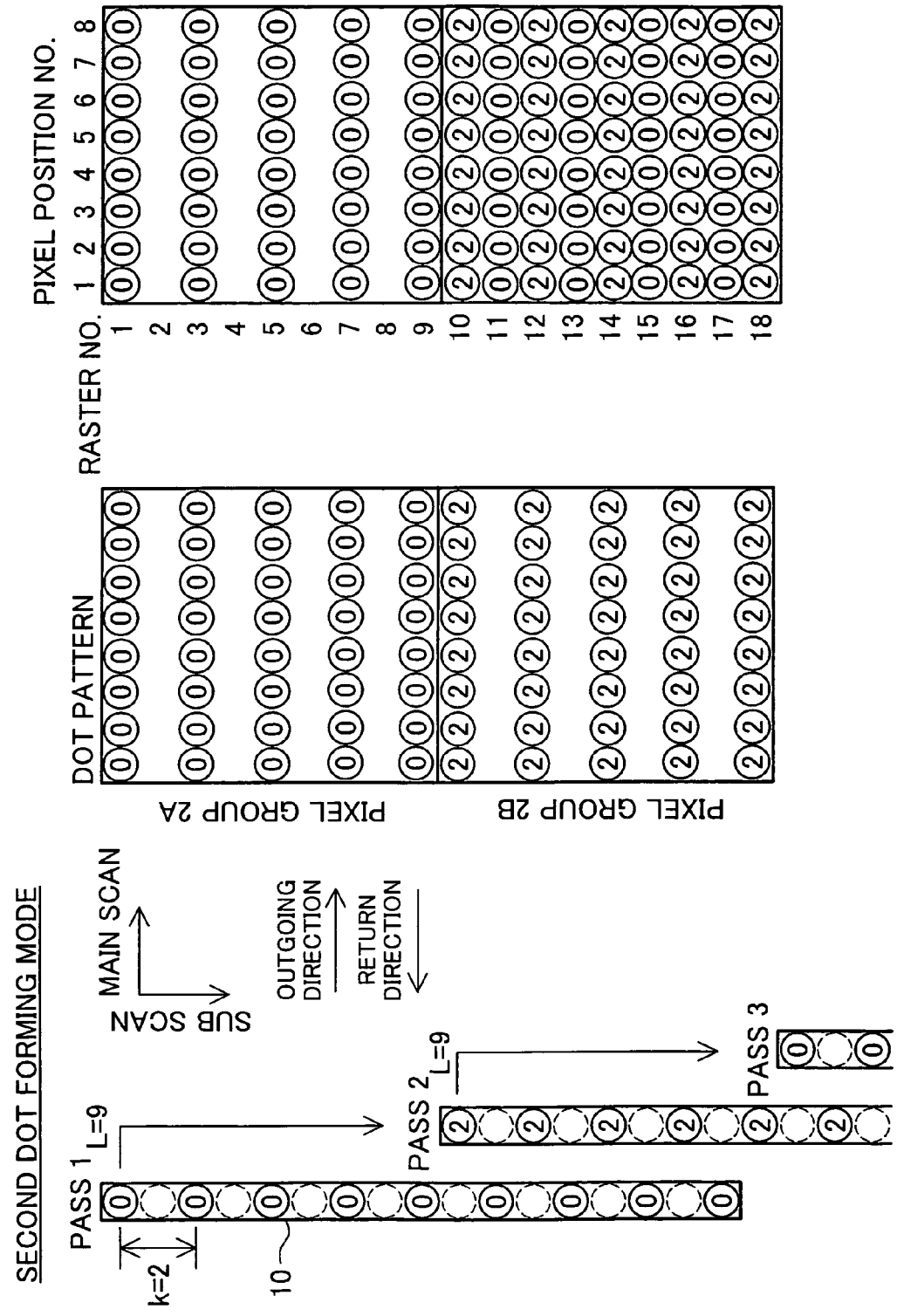
FIG. 3 is an explanatory drawing showing the state of the print image being generated on the printing medium using the second dot forming mode for the first embodiment of the present invention.

FIG. 3 is an explanatory drawing showing the state of a print image being generated on a printing medium by the second dot forming mode with the first embodiment of the present invention. The second dot forming mode differs from the first dot forming mode, which generates print image by mutually combining in a common printing area the dots formed on pixels belonging to four pixel groups 1A to 1D, in that it generates the print image by mutually combining in a common printing area the dots formed on pixels belonging to two pixel groups 2A and 2B.

Based on the concept of the optimization of the dither matrix described above, for optimization of the dither matrix for the second dot forming mode, this must be performed based on the two pixel groups 2A and 2B. However, the inventors ascertained the fact that optimization of the dither matrix for the second dot forming mode is almost all substantially performed with the optimization of the dither matrix for the first dot forming mode. Specifically, the optimization of the dither matrix that uses as its rating the two pixel groups 2A and 2B is realized simultaneously with the optimization of the dither matrix that uses as its rating the four pixel groups 1A to 1D.

The reason that the optimization of the dither matrix that uses as the rating the four pixel groups 1A to 1D is realized simultaneously with the optimization of the dither matrix that uses as the rating the two pixel groups 2A and 2B is because the pixel group 2A is a combination of the two pixel groups 1A and 1C and the pixel group 2B is a combination of the two pixel groups 1B and 1D. Specifically, this is because when the print image is generated by mutually combining a plurality of pixel groups in a common printing area, the feature of the present invention of optimization of the dither matrix with each pixel group as the rating being effective can be expanded for pixel groups with each other.

Note that the first and second dot forming modes are constituted as easy examples to make the description easy to understand, but typically, the present invention can be widely applied in cases when it is possible to constitute a plurality of pixel groups of one of the dot forming modes using a combination of part of the plurality of pixel groups of the other dot forming mode and other than part of the plurality of pixel groups.

Figure 4:
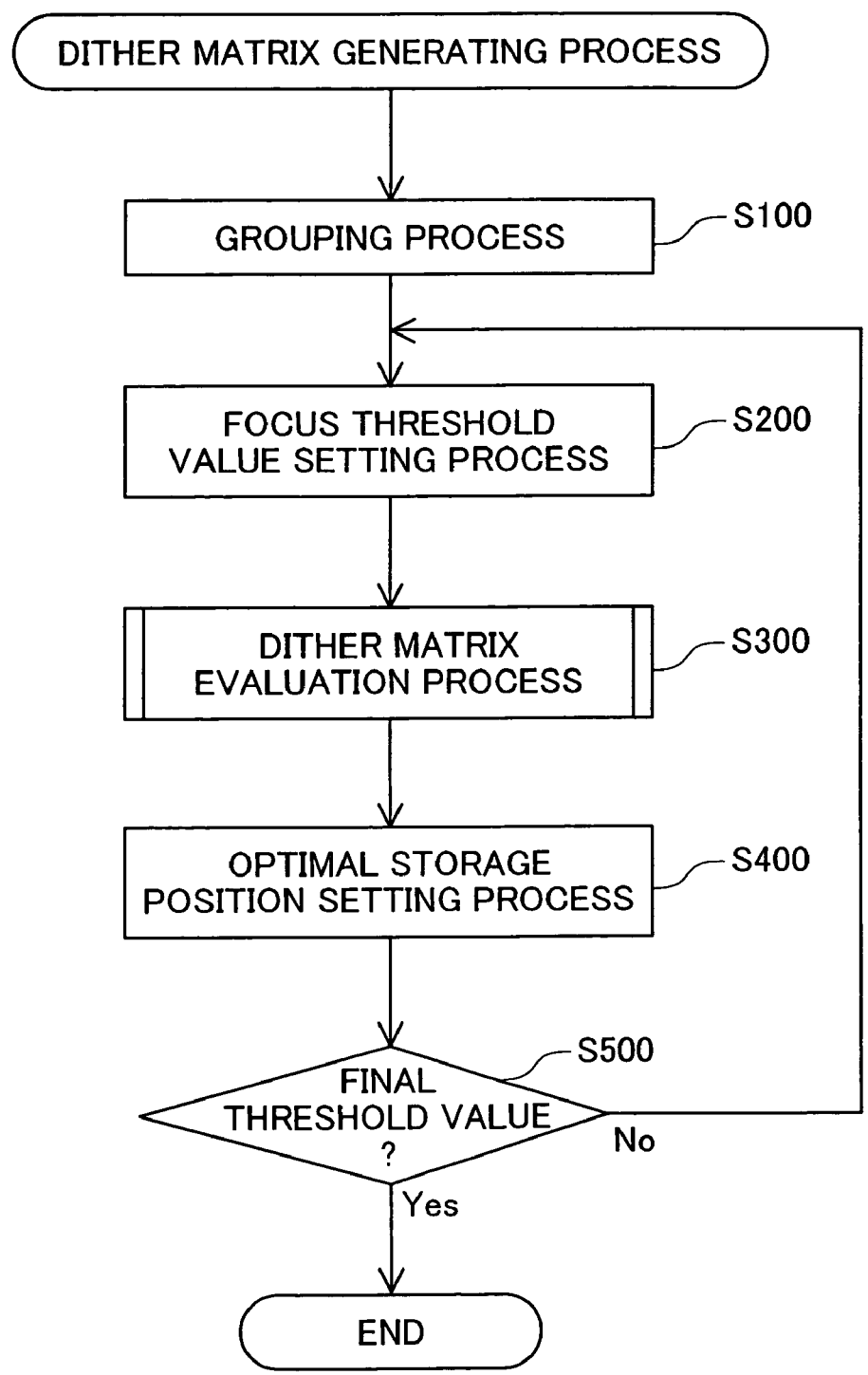
FIG. 4 is a flow chart showing the processing routine of the dither matrix generating method for the first embodiment of the present invention.

B. Dither Matrix Generating Method for the First Embodiment:

FIG. 4 is a flow chart showing the processing routine of the dither matrix generating method of the first embodiment of the present invention. This dither matrix generating method is constituted to be able to try to optimize considering the dispersibility of dots formed almost simultaneously with the print image forming process. Note that with this example, an 8 row by 8 column small dither matrix is generated to make the description easy to understand.

At step S100, the grouping process is performed. With this embodiment, the grouping process is the process of dividing the dither matrix into elements corresponding to the plurality of pixel groups for which dots are formed almost simultaneously with the print image forming process.

FIG. 5 is an explanatory drawing showing the dither matrix M for which grouping processing was performed for the first embodiment of the present invention. With this grouping process, this is divided into the four pixel groups in FIG. 1. The numbers noted in each pixel of the dither matrix M indicate the pixel group to which each element belongs. For example, the element of row 1, column 1 belongs to the pixel group 1A (FIG. 1), and the element of row 1, column 2 belongs to the pixel group 1B.

FIG. 6 is an explanatory drawing showing the four divided matrixes M0 to M3 for the first embodiment of the present invention. The divided matrix M0 is constituted from the plurality of elements corresponding to the pixels belonging to the pixel group 1A among the elements of the dither matrix M, and from the blank elements which are the plurality of elements that are blank. The blank space elements are elements for which dots are never formed regardless of the input gradation value. The divided matrixes M1 to M3 are constituted by the plurality of elements corresponding to the pixels belonging respectively to the pixel groups 1B to 1D among the elements of the dither matrix M and from blank elements.

In this way, when the grouping process (FIG. 4) of step S100 is completed, the process proceeds to the focus threshold value setting process (step S200).

At step S200, the focus threshold value setting process is performed. The focus threshold value setting process is the process of setting the threshold value that will be the storage element setting subject. With this embodiment, the threshold values are set by selecting in sequence from threshold values of relatively small values, specifically, threshold values for which dots are easily formed. This process will be described later.

At step S300, the dither matrix evaluation process is performed. The dither matrix evaluation process is a process that converts to numbers the optimality of the dither matrix based on an evaluation constant set in advance. With this embodiment, the evaluation function has uniformity with the dot recording density. Specifically, whether or not the plurality of dots formed on the pixels corresponding to each element of the matrix are formed uniformly for each gradation value is the evaluation criterion. However, with this embodiment, rather than considering only the dither matrix M, the evaluation is performed also considering the four divided matrixes M0 to M3.

Figure 7:
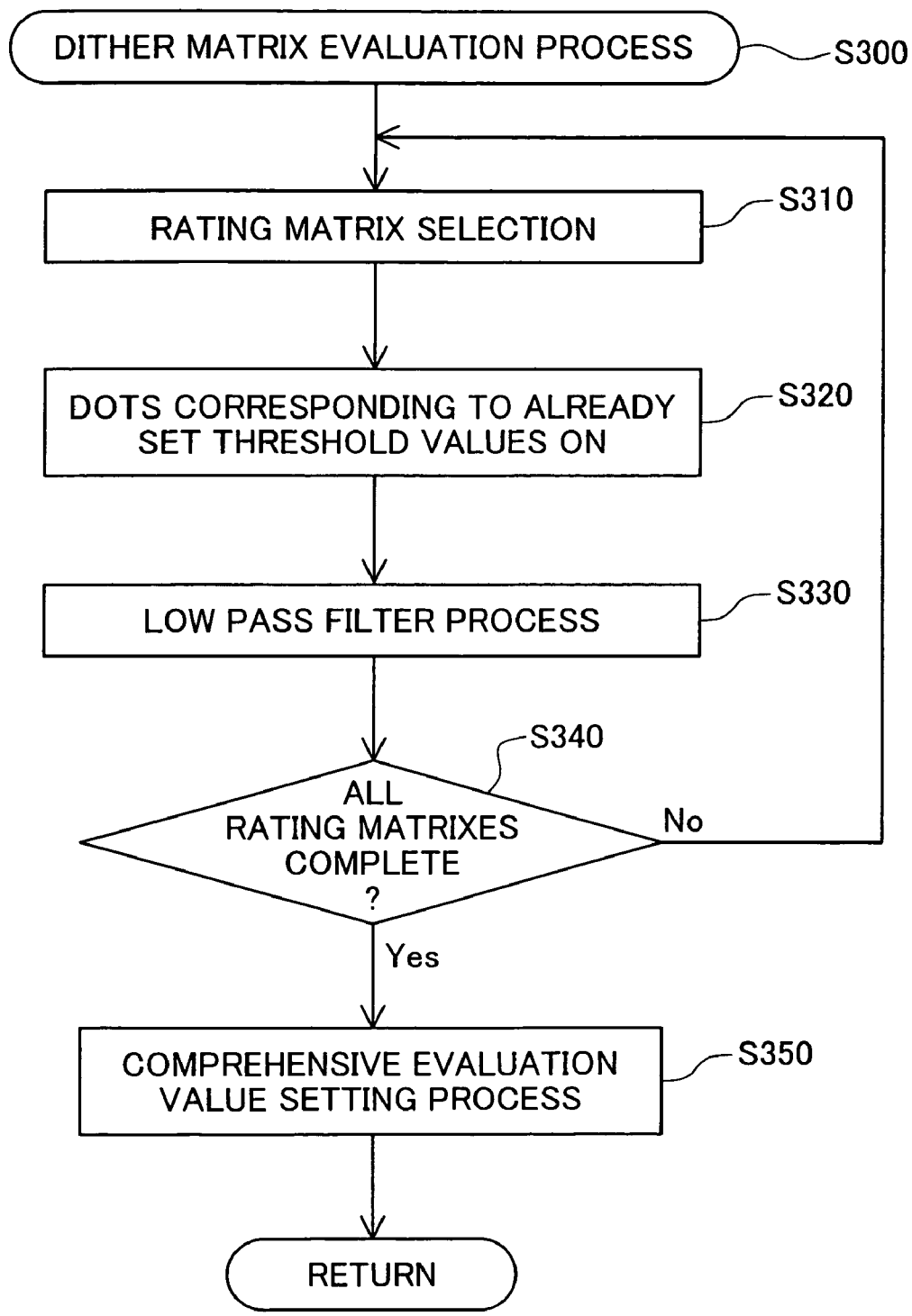
FIG. 7 is a flow chart showing the processing routine of the dither matrix evaluation process.

FIG. 7 is a flow chart showing the processing routine of the dither matrix evaluation process. At step S310, the rating matrix is selected. The rating matrix means the one matrix that is subject to evaluation when setting the focus threshold value storage element in the four divided matrixes M0 to M3. With this embodiment, evaluation is performed focusing on the rating matrix and the dither matrix M. However, it is also possible to constitute so that evaluation is performed focusing on all five matrixes.

With this embodiment, the rating matrix is selected in sequence together with the focus. In specific terms, the divided rating matrix is selected in sequence with the method of selecting the divided matrix M0 with the first focus threshold value, and the divided matrix M1 is selected with the second focus threshold value. The focus threshold value is stored in any of the elements belonging to the rating matrix.

At step S320, the already set threshold value corresponding dots are on. The already set threshold value means the threshold value for which the storage elements are set. With this embodiment, selection is done in sequence from the threshold values with values for which dots are formed easily as described previously, so when dots are formed at the focus threshold value, dots are definitely formed at the pixels corresponding to the elements in which the already set threshold value is stored. Conversely, for the smallest input gradation value for which dots are formed at the focus threshold value, dots are not formed at the pixels corresponding to the elements other than the elements in which the already set threshold value is stored.

FIG. 8 is an explanatory drawing showing the state of dots being formed at each of eight pixels corresponding to the elements at which are stored threshold values for which dots are formed easily from the first to the eighth. This dot pattern is used for setting which pixel at which to form the ninth dot. Specifically, it is used for setting the storage element of the focus threshold value for which dots are easily formed ninth. With this embodiment, setting of the storage element is setting the storage element so that the focus threshold value is stored in the element corresponding to the pixels for which dot formation is sparse. This is because whether or not the plurality of dots formed at the pixels corresponding to each element of the matrix are formed uniformly for each gradation value is the evaluation criterion.

FIG. 9 is an explanatory drawing showing a matrix for which the state of dot formation at each of the eight pixels in FIG. 8 is converted to numbers, specifically, the dot density matrix quantitatively representing the dot density. The number 0 means that dots are not formed, and the number 1 means that dots are formed.

At step S330, the low pass filter process is performed. The low pass filter process is the process of extracting the low frequency components for the previously described dot density matrix. Extraction of the low frequency component is for optimizing the dither matrix considering the human visual sensitivity characteristics which are relatively high in sensitivity in the low frequency range.

FIG. 10 is an explanatory drawing showing the low pass filter for the first embodiment of the present invention. With this embodiment, the filter processing results are used only for a dot density size comparison, so low pass filter normalization is not performed. With the filter process, as shown in FIG. 11, the same dot density matrix is placed at the periphery and is used for calculation of the peripheral part of the dot density matrix.

FIG. 12 is an explanatory drawing showing the results of low pass filter processing of the dot density matrix. The numbers within each element represent the overall evaluation value. The overall evaluation value means the evaluation value of each element when it is assumed that the ninth dot is formed at the dither matrix M for which eight threshold value storage elements are set. Large numbers mean that the dot density is high, and low numbers mean that the dot density is low, specifically, that the dots are sparse.

FIG. 13 shows a dot pattern for which only the dots corresponding to the pixels belonging to the divided matrix M0 are extracted from the dot pattern of FIG. 8. With this embodiment, for the pixels belonging to the divided matrix M0 as well, the storage elements are set so that the focus threshold value is stored in the element corresponding to the pixels for which dot formation is sparse.

FIG. 14 is an explanatory drawing showing the dot density matrix relating to the divided matrix M0. When the low pass filter process is performed on this dot density matrix (step S330), a group evaluation value (FIG. 15) is calculated. The group evaluation value means the evaluation value of each element when it is assumed that the third dot is formed at the divided matrix M0 for which two threshold value storage elements are set. The overall evaluation value and group evaluation value calculated in this way are used for setting the comprehensive evaluation value.

At step S350, the comprehensive evaluation value setting process is performed. The comprehensive evaluation value setting process is set by performing specific weighting on the overall evaluation value and the group evaluation value and adding. With this embodiment, as one example, the weightings of the overall evaluation value and the group evaluation value are respectively 4 and 1.

FIG. 16 is an explanatory drawing showing a matrix in which is stored the set comprehensive evaluation value. The comprehensive evaluation value is set as 16 for the row 1, column 1 element, for example. This value is set by multiplying 4 which is the weighting value on the value of 4 which is the overall evaluation value stored in the row 1, column 1 element of the matrix (FIG. 12) in which the overall evaluation value is stored, and by adding 0 which is the value of the group evaluation value stored in the row 1, column 1 element of the matrix (FIG. 15) in which is stored the group evaluation value.

FIG. 17 is a matrix for which only the elements belonging to the divided matrix M0 are extracted from the comprehensive evaluation value matrix of FIG. 16. There are sixteen elements belonging to the divided matrix M0, and two elements among the sixteen elements are set as the two threshold value storage elements. "Already" is indicated for the two threshold value storage elements.

At step S400 (FIG. 4), the storage element setting process is performed. The storage element setting process is a process of setting the storage element of the focus threshold value (with this example, the threshold value for which dots are easily formed eighth). With this embodiment, the storage element is set from among the elements for which the comprehensive evaluation value is the smallest. With this example, the row 1, column 1 and row 7, column 1 elements are storage element candidates because they have the same comprehensive evaluation value. The method of selecting from among the two storage element candidates can be based on the findings of the trained engineers or can also be the method described later.

When this kind of process is performed for all threshold values from the threshold value for which dots are formed most easily to threshold values for which dots are formed with the most difficulty, the dither matrix generating process is completed (step S500).

In this way, the dither matrix generating method of this embodiment is able to generate a dither matrix optimized for the printing device constituted so that formation is done by the printing pixels belonging to each of the four pixel groups 1A to 1D (FIG. 1, FIG. 2) formed almost simultaneously with each main scan being mutually combined in a common printing area.

Note that with this embodiment, an attempt is made to optimize the dither matrix with the four pixel groups 1A, 1B, 1C, and 1D used for the first dot forming mode as the rating, but for example it is also possible to attempt to optimize by adding the pixel groups 2A and 2B used for the second dot forming mode to the rating. In this case, it is preferable to attempt to optimize by multiplying the specified weighting of each rating.

Figure 18:
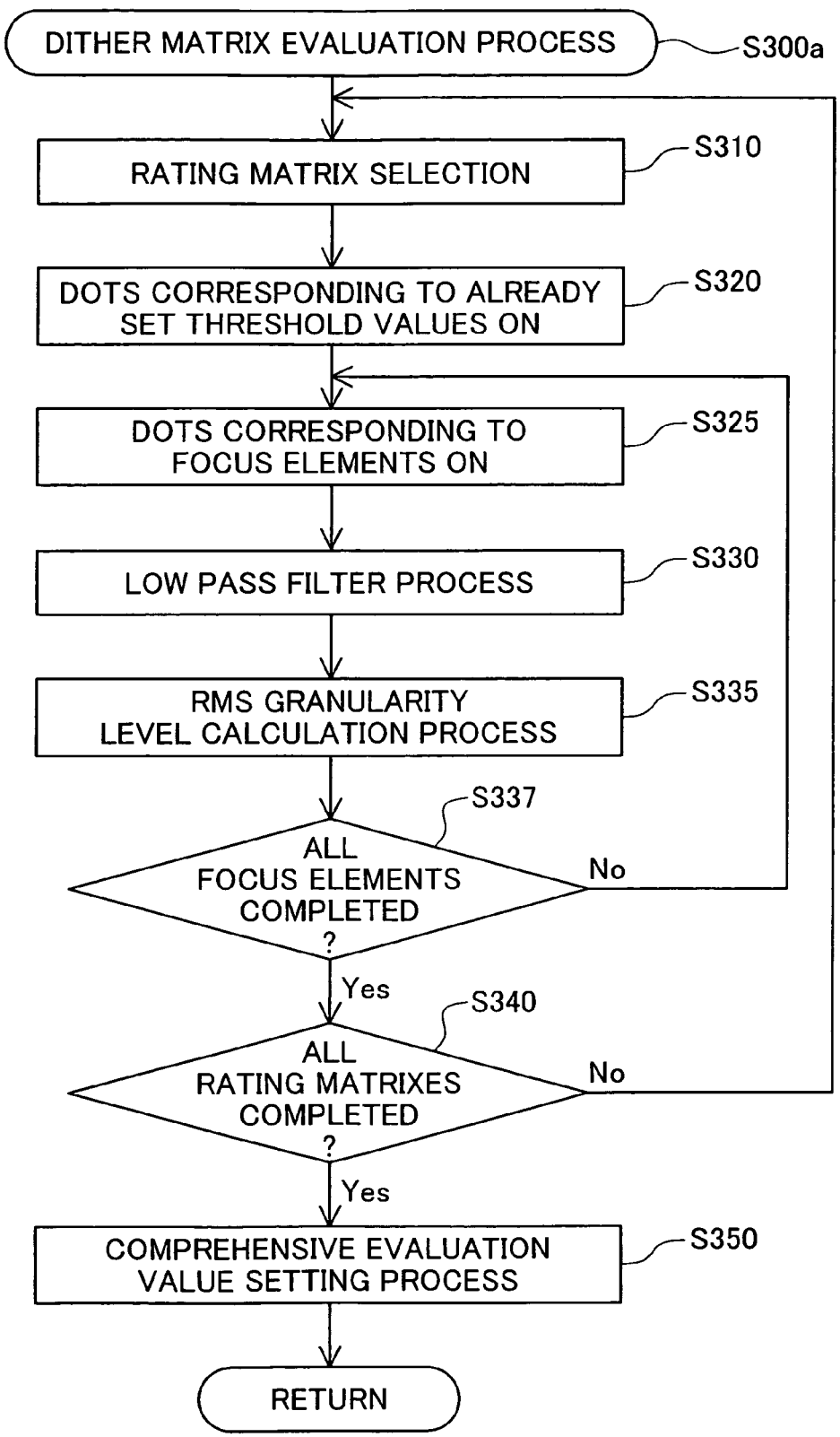
FIG. 18 is an explanatory drawing showing a flow chart showing the process routine of the dither matrix generating method for the second embodiment of the present invention.

C. Dither Matrix Generating Method of the Second Embodiment:

FIG. 18 is a flow chart showing the processing routine of the dither matrix generating method for the second embodiment of the present invention. The generating method of the second embodiment differs from the generating method of the first embodiment in terms of the dither matrix evaluation method. Specifically, the generating method of the second embodiment assumes that dots are formed at any of a plurality of pixels corresponding to not already set, specifically, unset plurality of candidate elements as the threshold value storage elements, and also differs from the first embodiment by the fact that the storage elements are set based on the RMS granularity of the dot patterns formed based on this assumption.

The generating method of the second embodiment can be realized by adding the process of step S325, the process of step S335, and the process of step S337 to the generating method of the second embodiment.

At step S325, the dots of the pixels corresponding to the focus elements are on. The focus element is one element selected from among a plurality of candidate elements. At step S330, the low pass filter process is performed the same as with the first embodiment.

At step S335, the RMS granularity is calculated. RMS granularity is a value calculated as the standard deviation after doing low pass filter processing of the dot density matrix. Calculation of the standard deviation can be performed using the formula in FIG. 19. Note that the calculation of the standard deviation does not absolutely have to be performed for the dot pattern corresponding to all the elements of the dither matrix M, but can also be performed using only the dot density of the pixels belonging to a specified window (for example a 5×5 partial matrix) to reduce the calculation volume. This kind of process is performed for all the focus pixels (step S337).

The values calculated using this kind of process correlates to the overall evaluation value and the group evaluation value of the first embodiment. The second embodiment is able to generate an optimal dither matrix by performing evaluation based on the RMS granularity by handling the calculated overall evaluation value and group evaluation value in the same way as the first embodiment.

Note that the evaluation method of the second embodiment can also be combined with the evaluation method of the first embodiment. Specifically, it is possible to narrow down the candidate elements of the second embodiment using the evaluation method of the first embodiment, and also to set the storage elements based on the RMS granularity from the narrowed down candidate elements. For example, with the example shown in the first embodiment, the two element evaluation values are the same, but these two elements can be used as the candidate elements of the second embodiment. Furthermore, it is also possible to constitute this so that the elements within a specified evaluation value range (for example with the evaluation value difference 5 or less) are used as the candidate elements.

Also, the dither matrixes constituted using each of the methods described above must have the kinds of characteristics noted below. First, any of the plurality of group RMS granularity levels which are the RMS granularity level of the low frequency component of the group dot patterns formed for each of the plurality of pixel groups are smaller than the RMS granularity level of the low frequency component of the dot patterns formed on any of the pixel groups other than the plurality of pixel groups that are the pixel groups constituted by mutually combining the print images in a common printing area.

Second, any of the plurality of group dot uniformity levels which are the uniformity of the dot density distribution of the low frequency components of the group dot patterns formed on each of the plurality of pixel groups are higher than the uniformity of the dot density distribution of the low frequency component of the dot patterns formed on any of the pixel groups other than the plurality of pixel groups which are the pixel groups constituted by mutually combining the print images in a common printing area.

Third, any of the plurality of group granularity evaluation values which are the granularity evaluation values calculated based on the value obtained by implementing the Fourier transformation process on the group dot pattern formed on each of the plurality of pixel groups and on the visual spatial frequency characteristics function are smaller than the granularity evaluation values of the dot patterns formed for any of the pixel groups other than the plurality of pixel groups that are the pixel groups constituted by mutually combining the print image in a common printing area.

Fourth, any of the plurality of group RMS granularity levels that are the RMS granularity level of the low frequency component of the group dot pattern formed for each of the plurality of pixel groups is closer to the overall RMS granularity level of the dither matrix than any of the plurality of group RMS granularity levels for the virtual dither matrix constituted so that the overall RMS granularity level that is the RMS granularity level of the low frequency component of the overall dot pattern formed on all the pixels constituting the print image is smaller than the dither matrix.

Fifth, any of the plurality of group dot uniformity levels that are the uniformity of the dot density distribution of the low frequency component of the group dot pattern formed for each of the plurality of pixel groups is closer to the overall dot uniformity level of the dither matrix than the plurality of group dot uniformity levels for the virtual dither matrix constituted so that the overall dot uniformity level which is the uniformity of the dot density distribution of the low frequency component of the overall dot pattern formed on all the pixels constituting the print image is higher than the dither matrix.

Sixth, any of the plurality of group dot granularity evaluation values which are the granularity evaluation values calculated based on the value obtained by implementing the Fourier transformation process on the group dot patterns formed on each of the plurality of pixel groups and on the visual spatial frequency characteristics function is closer to the overall granularity evaluation value of the dither matrix than any of the plurality of group granularity evaluation values for the virtual dither matrix constituted so that the overall granularity evaluation value which is the granularity evaluation value of the overall dot pattern formed on all the pixels constituting the printing image is lower than the dither matrix.

The six characteristics described above are because they cannot be achieved coincidentally without constituting by assuming a plurality of pixel groups for which physical differences are assumed when forming dots as with the invention of this application.

D. Variation Examples:

Above, several aspects of the present invention were described, but the present invention is not limited in any way to these kinds of aspects, and various aspects can be implemented in a scope that does not stray from the key points. For example, with the present invention, dither matrix optimization is possible for the following kinds of variation examples.

Figure 20:
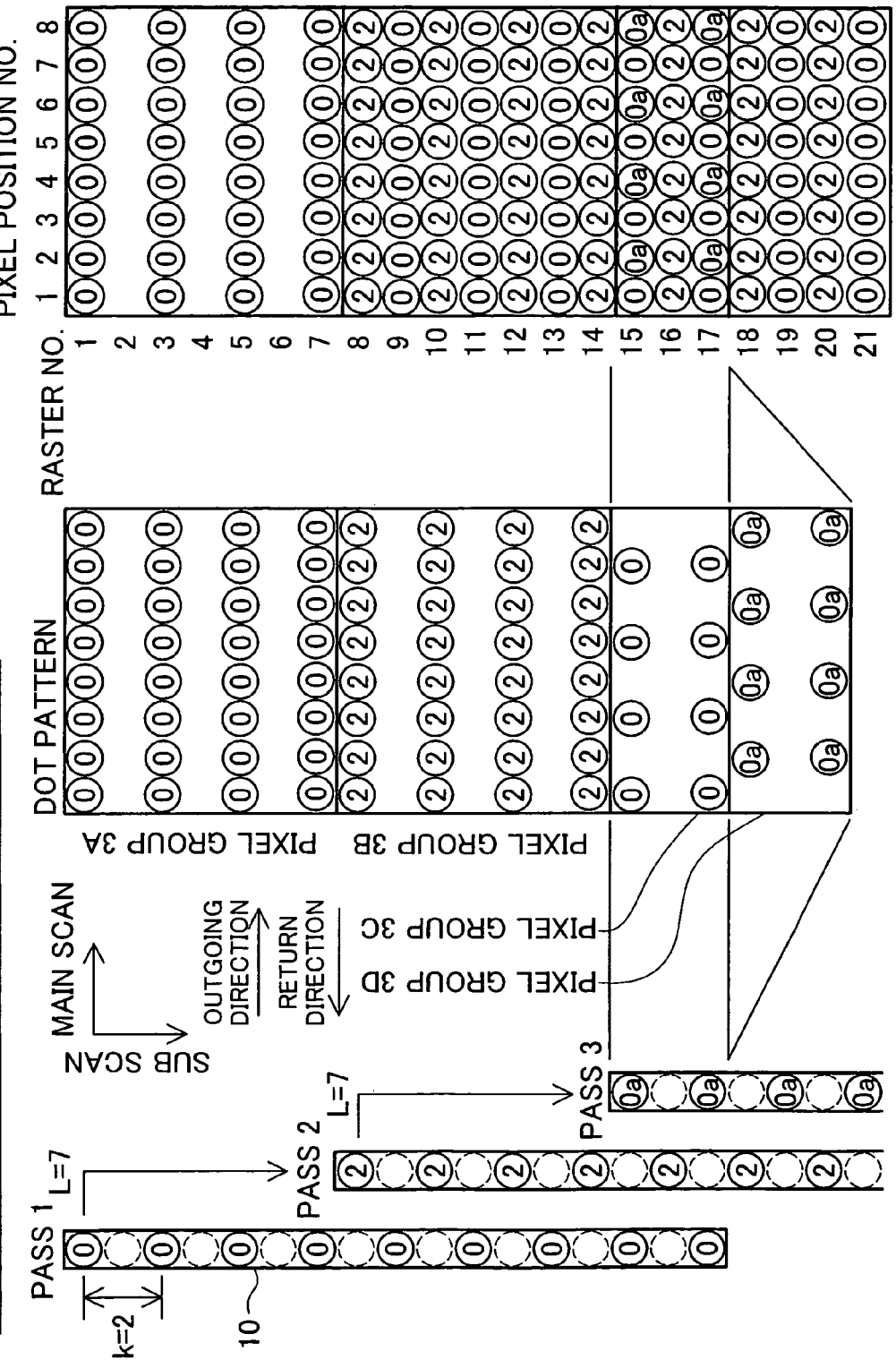
FIG. 20 is an explanatory drawing showing the state of the print image being generated on the printing medium by the dot forming mode of the first variation example.

D-1. With the embodiments described above, the constitution was with all the print image areas as a combination of the same pixel groups, but it is also possible, for example, using the dot forming mode of the first variation example of FIG. 20, to constitute the print image from a first type of area (for example the area of raster numbers 8 to 14) for which the print image is generated as a combination of two pixel groups 3A and 3B, and a second type of area (for example the area of raster numbers 15 to 17) for which the print image is generated as a combination of three pixel groups 3B, 3C, and 3D.

In this way, dot forming methods for which the pixel group changes according to the printing area are disclosed in Unexamined Patent No. 9-169109, Unexamined Patent No. 7-319644, Unexamined Patent No. 2003-231247, and Unexamined Patent No. 2002-11859 that constitute a technical standard during application for this application. Even for the dot forming method disclosed in these documents, the present invention can be applied.

D-2. With the examples described above, one dither matrix is constituted to correspond to a plurality of dot forming methods, but it is also possible, for example, to constitute this with two dither matrixes corresponding to three dot forming methods. Specifically, for example such as in a case when a special printing method is implemented, it is possible to include a dot forming mode that does not try to standardize the dither matrix, and to have the dither matrix shared with at least part of the dot forming mode.

Figure 21:
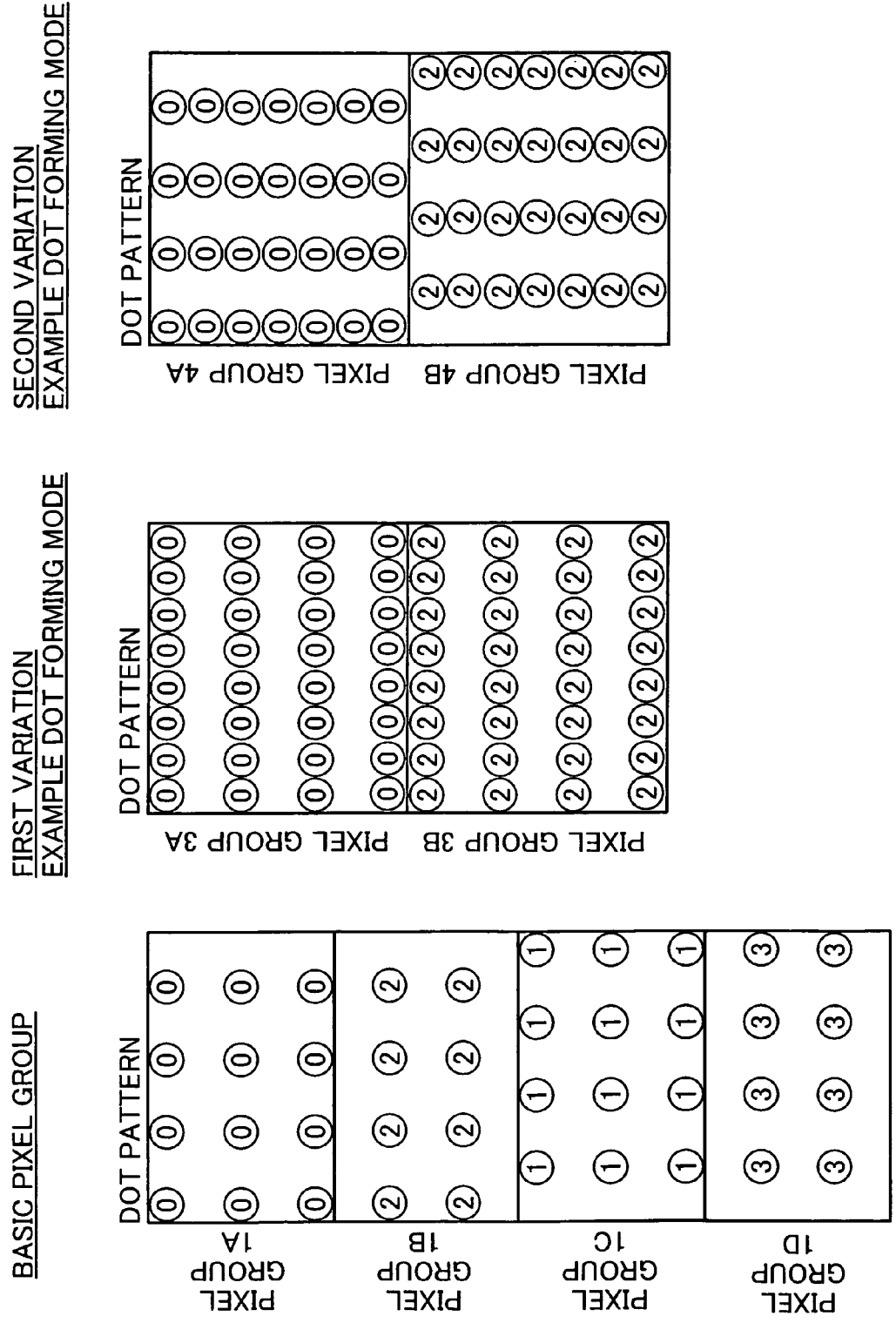
FIG. 21 is an explanatory drawing showing the pixel groups corresponding to the basic pixel groups and the dot forming mode of the first variation example and the second variation example constituted from the basic pixel groups.

D-3. With the examples described above, an example is shown of a case when it is possible to have a plurality of pixel groups of one dot forming mode to constitute with a another combination of a portion of the plurality of pixel groups of another dot forming mode and other than part of the plurality of pixel groups, but furthermore, as shown in FIG. 21, the present invention can also be applied in cases such as when constituting both by common denominator pixel groups (basic pixel groups) such as with the dot forming mode of the first variation example and the dot forming mode of the second variation example.

With the dot forming mode of the first variation example, the print image is formed using the two pixel groups 3A and 3B. Meanwhile, with the dot forming mode of the second variation example, the print image is formed using the two pixel groups 4A and 4B. The pixel group 3A is constituted by combining the two pixel groups 1A and 1C. The pixel group 3B is constituted by combining the two pixel groups 1B and 1D. The pixel group 4A is constituted by combining the two pixel groups 1A and 1B. The pixel group 4B is constituted by combining the two pixel groups 1A and 1B.

In this kind of case, the same as with the first and second embodiments described above, optimization of the dither matrix can be done with the four pixel groups 1A, 1B, 1C, and 1D as the rating. Note that with this variation example, the four pixel groups 1A, 1B, 1C, and 1D correlate to the "plurality of basic pixel groups" in the claims. Note that with FIG. 21, the position of the dots of the pixel groups 1B and 1D are placed skewed by 1 dot pitch in the main scan direction in relation to FIG. 1 to make the description easy to understand.

D-4. With the embodiments described above, halftone processing is performed using the dither matrix, but for example it is possible to apply the present invention also to cases of performing halftone processing using error diffusion, for example. Use of error diffusion can be realized making it possible to perform error diffusion processing for each group of the plurality of pixel positions, for example. In specific terms, for the constitution of the embodiments and variation examples described above, realization is possible by performing halftone processing using the error diffusion method which does error diffusion individually for each pixel group belonging to the four pixel groups 1A, 1B, 1C, and 1D.

D-5. With the embodiments described above, to perform calculation of the peripheral part of the dot density matrix, as shown in FIG. 11, the same dot density matrix is placed so as not to be displaced to the periphery, but for example as shown in FIG. 22, it is also possible to displace the matrix for placement.

However, the matrix displacement volume is preferably made so that the group positional relationship does not skew between adjacent dot density matrixes as shown in FIG. 22, for example. This is because by doing this, it is possible to use the same process as the process within a single dot density matrix even with filter processing of a dot density matrix peripheral area that extends across a plurality of dot density matrixes.

D-6. With the embodiments described above, the evaluation criterion is whether or not the plurality of dots formed on pixels corresponding to each element of the matrix overall are formed uniformly for each tone value, but for example, it is also possible to constitute so that the evaluation is done based not on the matrix overall, but only on the plurality of dots formed on the pixels corresponding to each element of part of the matrix.

D-7. With the embodiments described above, together with performing the low pass filter process, the optimality of the dither matrix is evaluated based on the dot density uniformity or RMS granularity level, but, for example, it is also possible to constitute so that together with performing the Fourier transformation on the dot pattern, evaluation of the dither matrix is performed using the VTF function. In specific terms, it is possible to constitute this so that the evaluation scale (Grainess scale: GS value) used by Dooley et al of Xerox is applied to the dot pattern, and the dither matrix optimality is evaluated using the GS value. Here, the GS value is the granularity evaluation value which can be obtained by performing a specified process including two dimensional Fourier transformation on the dot pattern to do number conversion and by integrating after cascading with the visual spatial frequency characteristic VTF (reference: Fine Imaging and Hard Copies, Corona Co., Society of Photographic Science and Technology of Japan, Imaging Society of Japan, edited by Godo Publishing Committee. p. 534). However, the former has the advantage of complex calculation such as Fourier transformation not being necessary. Note that the GS value is also called the granularity index.

Finally, the entire disclosure of Japanese Patent Application No. 2005-305738 filed on Oct. 20, 2005 and U.S. patent application Ser. No. 11/350,374, are expressly incorporated by reference herein.

What is claimed is:

1. A printing method of printing on a printing medium, comprising:
   a dot data generating step of performing a halftone process on image data representing a input tone value of each of pixels constituting an original image, for generating dot data representing a status of dot formation on each of print pixels of a print image to be formed on the print medium; and
   a print image generating step of forming a dot on each of the print pixels for generating the print image according to the dot data, wherein
   the halftone process is configured to give specified characteristics to all of dot patterns formed on printing pixels belonging to each of a plurality of basic pixel groups constituting the print image,
   the print image generating step includes the step of generating the print image by mutually combining dots formed on print pixels belonging to each of a plurality of pixel groups in a common print area, the plurality of pixel groups having a physical difference each other at the dot formation, the dot formation being performed with respect to each of the pixel groups; and
   the plurality of pixel groups consists of a pixel group that is a combination of a plurality of specific basic pixel groups among the plurality of basic pixel groups, and a pixel group other than the specific basic pixel groups among the plurality of basic pixel groups.

2. The printing method according to claim 1, wherein
   the print image generating step includes the step of generating the print image by forming dots on each of the printing pixels using at least one of a plurality of dot forming modes including a first dot forming mode and a second dot forming mode according to the dot data,
   the print image generating step includes the step of generating the print image by mutually combining dots formed on print pixels belonging to each of a plurality of first pixel groups in a common print area in the first dot forming mode, the plurality of first pixel groups having a physical difference each other at the dot formation, the dot formation being performed with respect to each of the first pixel groups; and
   the print image generating step includes the step of generating the print image by mutually combining dots formed on print pixels belonging to each of a plurality of second pixel groups in a common print area in the second dot forming mode, the plurality of second pixel groups having a physical difference each other at the dot formation, the dot formation being performed with respect to each of the second pixel groups; and
   the plurality of second pixel groups consists of a pixel group that is a combination of a plurality of specific first pixel groups among the plurality of first pixel groups, and a pixel group other than the specific first pixel groups among the plurality of first pixel groups, wherein
   the halftone process is configured to give specified characteristics to all of dot patterns formed on printing pixels belonging to each of the plurality of first pixel groups.

3. The printing method according to claim 2, wherein
   the printing method is configured such that printing is performed using any of the plurality of printing modes including a first printing mode for generating the print image using the first dot forming mode and a second printing mode for generating the print image using the second dot forming mode.

4. The printing method according to claim 2, wherein
   the printing method is configured such that printing is performed by any of the plurality of dot forming modes including the first dot forming mode and the second dot forming mode according to an area of the print image.

5. The printing method according to claim 1, wherein
   the specified characteristic is a granularity evaluation value.

6. The printing method according to claim 1, wherein
   the specified characteristic is either one of blue noise characteristics and green noise characteristics.

7. A printing apparatus for printing on a printing medium, comprising:
   a dot data generator that performs a halftone process on image data representing a input tone value of each of pixels constituting an original image, for generating dot data representing a status of dot formation on each of print pixels of a print image to be formed on the print medium; and
   a print image generator that forms a dot on each of the print pixels for generating the print image according to the dot data, wherein
   the halftone process is configured to give specified characteristics to all of dot patterns formed on printing pixels belonging to each of a plurality of basic pixel groups constituting the print image,
   the print image generator generates the print image by mutually combining dots formed on print pixels belonging to each of a plurality of pixel groups in a common print area, the plurality of pixel groups having a physical difference each other at the dot formation, the dot formation being performed with respect to each of the pixel groups; and
   the plurality of pixel groups consists of a pixel group that is a combination of a plurality of specific basic pixel groups among the plurality of basic pixel groups, and a pixel group other than the specific basic pixel groups among the plurality of basic pixel groups.

8. A computer program product for causing a computer to generate dot data to be supplied to a print image generator for generating a print image by forming dots on a print medium, the computer program product comprising:
   a computer readable medium; and
   a computer program stored on the computer readable medium, the computer program comprising a program for causing the computer to perform a halftone process on image data representing a input tone value of each of pixels constituting an original image, for generating dot data representing a status of dot formation on each of print pixels of a print image to be formed on the print medium, wherein
   the halftone process is configured to give specified characteristics to all of dot patterns formed on printing pixels belonging to each of a plurality of basic pixel groups constituting the print image,
   the program includes a program for causing the computer to generate the print image by mutually combining dots formed on print pixels belonging to each of a plurality of pixel groups in a common print area, the plurality of pixel groups having a physical difference each other at the dot formation, the dot formation being performed with respect to each of the pixel groups; and the plurality of pixel groups consists of a pixel group that is a combination of a plurality of specific basic pixel groups among the plurality of basic pixel groups, and a pixel group other than the specific basic pixel groups among the plurality of basic pixel groups.

* * * * *